United States Patent Office 3,161,697
Patented Dec. 15, 1964

3,161,697
CATALYTIC CONVERSION OF PROPENE INTO HIGHER BOILING HYDROCARBONS
Johannes H. Choufoer, Hendrikus de Ruiter, and Dick van Zoonen, all of Amsterdam, Netherlands, assignors to Shell Oil Company, New York, N.Y., a corporation of Delaware
No Drawing. Filed Oct. 31, 1960, Ser. No. 65,896
Claims priority, application Netherlands, Apr. 29, 1960, 251,102
6 Claims. (Cl. 260—683.15)

This invention relates to a process for the catalytic conversion of propene into higher boiling hydrocarbons. More particularly, the process relates to the catalytic conversion of propene into higher boiling branched chain hydrocarbons.

The conversion of normally gaseous hydrocarbons, such as propene, into high octane gasoline components by means of catalytic processes such as polymerization and alkylation is well known. Catalysts for the polymerization of olefins are primarily acidic in nature, the most commonly used catalysts being sulfuric acid and phosphoric acid. Other catalysts, such as aluminum chloride, zinc chloride, titanium chloride, and activated clays are known. Synthetic silica-alumina is also used occasionally, but has the disadvantage of polymerizing only a relatively small percentage of olefins charged.

Perhaps the most commonly used process for polymerizing propene into higher boiling hydrocarbons is polymerization over a solid catalyst comprising phosphoric acid supported on kieselguhr. In this process the propene is converted into olefinic products such as dimer, trimer and tetramer which are valuable because of their high octane rating. However, their presence in motor gasoline in recent years has been increasingly undesirable because of their high sensitivity and because of air pollution problems. By sensitivity it is meant the difference in octane rating determined by the Research Method (F-1) and the octane rating determined according to the Motor Method (F-2). It is known that these higher boiling olefinic products can be converted to the corresponding saturated hydrocarbon by separate hydrogenation process, usually by a catalytic process employing such catalysts as tungsten, molybdenum, manganese, iron, nickel, cobalt, etc., their sulfides and oxides and combinations thereof. This hydrogenation is achieved in separate process facilities which requires added capital and operating costs.

In the alkylation process, propene is converted into higher boiling hydrocarbons by alkylating it with isobutane in the presence of a mineral acid catalyst such as concentrated sulfuric acid. The alkylate, a paraffinic hydrocarbons which have a high octane rating, is a valuable component in gasoline blending. However, the alkylation process requires isobutane which is usually of limited supply and also is an expensive process.

It has now been found that propene can be converted in high yields to higher boiling branched hydrocarbons by contacting the propene with a solid catalyst comprising an acidic component and a hydrogenation component. The conversion is carried out at an elevated temperature and pressure in the presence of hydrogen or a hydrogen-containing gas.

The catalyst used in the process of the invention comprises a sulfide of one or more of the metals of the left-hand column of Group VI (chromium, molybdenum, tungsten) and/or a sulfide of one or more of the metals of Group VIII (iron, cobalt, nickel) of the Periodic Table deposited on a solid acidic support which in itself has catalytic properties. By a solid acidic support it is meant those which, when absorbing butter yellow and still other weaker basic indicators, show a color change of these indicators, indicating the transition to the acid form. Suitable acidic supports for the dual-function catalysts of the invention are compounds of silica and alumina, such as silica-alumina cracking catalyst, compounds of silica and zirconium dioxide, compounds of boron trioxide and alumina, compounds of boron trioxide and silica compounds, compounds of alumina and halogens such as alumina and fluorine, and the like. A support consisting of silica-alumina compounds, and particularly those having a silica content of at least 60% by weight and an alumina content of about 1–40% by weight are preferred.

A component having hydrogenation activity is deposited or distended on the solid acid catalyst component. Suitable components showing hydrogenation activity are sulfides of the metals of the left-hand column of Group VI and/or the metals of Group VIII of the Periodic Table. Nickel sulfide and/or cobalt sulfide are particularly preferred.

The amount of metal sulfide applied to the acid catalyst component can vary within wide limits and is generally in the range of from about 0.5 to about 15% by weight based on the total catalyst. Thus, for example, a catalyst containing silica and alumina and having a silica content of at least 60% by weight (based on the total catalyst) and to which is applied 1 to 10% by weight of nickel sulfide (based on the total catalyst) is an excellent catalyst for use in the process of the invention. The metal sulfide can be applied to the acid catalyst support, for instance silica-alumina cracking catalyst, by any suitable method known per se. For example, the metal sulfide can be applied by impregnating the acid catalyst with a solution of a salt of the corresponding metal, for instance nickel nitrate, followed by drying, calcining and finally sulfiding with hydrogen sulfide or a gas containing hydrogen sulfide.

The silica-alumina support preferably is calcined at an elevated temperature prior to impregnation with the metal sulfide. This calcination can be carried out at temperatures up to about 600° C. Higher calcination temperatures generally are undesirable since they lead to increased disproportionation reactions in the conversion process.

In the process of the invention, propene is mainly converted into higher boiling branched paraffins and/or branched olefins with branched hydrocarbons having 4, 5 and 6 carbons atoms per molecule being formed predominantly. Little or no hydrocarbons boiling lower than propene are formed in the process. The hydrocarbon feed to the process can be substantially pure propene or a mixture of hydrocarbons containing, in addition to propene, fairly large quantities of other compounds such as propane. For example, an excellent feed for the process of the invention is a $C_3$ fraction recovered from a thermal or catalytic cracking process. Other olefins, particularly higher boiling olefins, can be present in the hydrocarbon feed and are mainly converted into branched or more highly branched paraffins and/or olefins. The isomerization of normal butene and higher normal olefins over catalysts comprising nickel sulfide on cracking catalysts is described in copending application Serial No. 39,818 filed June 30, 1960 by Joost C. Platteeuw and Johannes H. Choufoer.

The exact manner in which the conversion reaction proceeds is not known but it is considered to be a complex mechanism involving polymerization, cracking, isomerization and hydrogenation reactions.

The degree of saturation of the final product depends on the composition of the catalyst and the reaction conditions used, since the catalyst has the property of wholly or partly converting into saturated hydrocarbons both the olefins present in the starting material and the olefins (mainly branched) formed during the reaction of the propene. In this connection, the reaction conditions, in particular the liquid hourly space velocity, are important. A lower liquid hourly space velocity results in a more drastic hydrogenation of the unconverted olefins as well as any olefins formed. Liquid hourly space velocity of the starting materials to be converted generally varies from 0.5 to 20 liters of liquid hydrocarbons per hour per liter of catalyst (l/h.l.), although lower or higher space velocities may also be used. If the reaction conditions are such that there is little or no hydrogenation of the reaction product, the product may, if desired, be separately catalytically hydrogenated in the usual manner known per se, for instance by means of a catalyst containing nickel, platinum, or cobalt oxide, molybdenum oxide.

The propene conversion is carried out in the presence of hydrogen or a hydrogen-containing gas at an elevated pressure, preferably at a total pressure within the range of from 10 to 100 atmospheres, and particularly at a total pressure in the range of from 20 to 60 atmospheres. Total pressures exceeding 100 atmospheres preferably are not used, since the higher the pressure the lower is the yield of branched compounds. The hydrogen partial pressure can vary within wide limits and is preferably from 50% to 95% of the total pressure. Pure hydrogen need not necessarily be used as hydrogen-containing gases, such as hydrogen-rich gases formed in catalytic reforming as naphthas, are also suitable.

Conversion of the propene is carried out at an elevated temperature generally in the range of from 100° C. to 500° C. and preferably at about 200° C. to 400° C. The catalysts used in the present process have excellent activity even at the preferred low temperatures.

The process of the invention can be used also with particular advantage when the olefinic starting material contains diolefins, such as, for example, propadiene and methylacetylene. The active life of solid catalysts used alone heretofore was found to be very short, particularly with such feed stocks containing diolefins, and this is presumably due to the formation of diene polymers and the like which deposit on the catalyst and rapidly reduce its activity. In the present process, however, the dienes are selectively hydrogenated to the monoolefins which again participate in the conversion reaction (or any subsequent hydrogenation reaction). This not only extends the life of the catalyst, but leads to a higher yield of branched hydrocarbons.

The following examples further illustrate the principles of the invention and show in more detail one method of carrying it out. They also indicate the advantages, particularly with respect to conversion of propene to higher boiling branched chain hydrocarbons.

EXAMPLE I

A mixture of propane and hydrogen (molar hydrogen/hydrocarbon ratio=4:1) was passed over a solid acidic catalyst consisting of 83.8% by weight of silica, 11.4% by weight of alumina and 4.8% by weight of nickel sulfide at a total pressure of 20 kg./sq.cm., a temperature of 300° C. and a liquid hourly space velocity of 2 l/h.l.

The following table shows the composition of the reaction product after a test period of 5 hours.

TABLE I

*Conversion of Propene Over a Catalyst Comprising Nickel Sulfide on Silica-Alumina*

Composition of final product, percent by weight (based on the feed):

| | |
|---|---|
| Methane | 0.1 |
| Ethene and ethane | 0.1 |
| Propene and propane | 30.2 |
| i-butene and i-butane | 41.9 |
| n-butenes and n-butane | 0.5 |
| i-pentenes and pentane | 10.3 |
| n-pentenes and n-pentane | 0.2 |
| i-hexenes and i-hexanes | 13.6 |
| n-hexenes and n-hexane | 0.0 |
| higher boiling hydrocarbons | 3.0 |

The data in Table I show that only very slight quantities of methane and $C_2$-hydrocarbons are formed, whereas high yields of branched $C_4$-, $C_5$- and $C_6$-hydrocarbons are obtained. It is noticeable also that straight-chain hydrocarbons having a higher boiling point than propane and propene are almost entirely absent.

EXAMPLE II

A silica-zirconia cracking catalyst containing 95 parts of silica to 5 parts zirconia by weight is impregnated with cobalt nitrate. After drying for two hours at 180° C. and calcining in air for two hours at 500° C., the catalyst is prepared for use in the process of the invention by passing hydrogen sulfide gas over it for about 4 hours at 500° C. A $C_3$ cracked fraction comprising approximately 60% propene and 40% propane is passed, with hydrogen (hydrogen/propene molar ratio of approximately 6:1), over the catalyst at a total pressure of 30 atmospheres, a temperature of 275° C. and a liquid hourly spaced velocity of 2.5 l/h.l. The propene is converted to higher boiling branched hydrocarbons with little or no formation of lower boiling hydrocarbons.

EXAMPLE III

A solution of 966 g. of $AlCl_3.6$ aq. in 10 liters of water was mixed intensively with 10 liters of ammonia solution of 2.7% concentration. Mixing took place by tangentially introducing each solution at a rate of 20 liters per hour into a mixing chamber, in such a way that after mixing the pH was between 8 and 8.5. Precipitation of the aluminum hydroxide gel was carried out without heating. As soon as precipitation was complete the reaction mixture was heated to a temperature between 50° C. and the boiling point of the mixture. The slurry obtained was stirred for a quarter of an hour, filtered, and washed with 70 liters of ammonia of 0.25% concentration until the washing water after being acidified with $HNO_3$ produced no further precipitation with $AgNO_3$.

Further washing was subsequently carried out with 10 liters of distilled water. After having been washed with distilled water, this gel was dried for 6 hours at 180° C. and subsequently calcined for 2 hours at 500° C. in air. 94 g. of the dry aluminum oxide thus obtained was impregnated with 90 ml. of HF solution, containing 0.47 g. of F. The product thus obtained was then dried for 2 hours at 180° C. and calcined in air for 2 hours at 500° C. It was subsequently impregnated with 12.7 g. of ammonium molybdate (81.4% of $MoO_3$), dissolved in 90 ml. of $H_2O$. After drying for 2 hours at 180° C. and calcining in air for 2 hours at 500° C., the catalyst is prepared for use in the process of the invention by passing hydrogen sulfide gas over it for about 4 hours at 500° C.

A $C_3$ cracked fraction containing 52% by volume propene and the remainder substantially propane is passed together with a hydrogen-containing gas over the above prepared molybdenum sulfide catalyst at a liquid hourly space velocity of 1.5, a temperature of 250° C., and a total pressure of 25 atmospheres. The hydrogen-containing gas is obtained from the catalytic reforming of straight-run naphtha over an acidic platinum catalyst and contains 88 mol percent hydrogen. The hydrogen/propene ratio is about 7.5:1. The propene is converted at a high yield to higher boiling branched hydrocarbon with little or no formation of lower boiling hydrocarbons or higher boiling straight-chain hydrocarbons.

We claim as our invention:

1. A process for the conversion of propene into higher boiling branched hydrocarbons having from 4–6 carbon atoms per molecule which comprises contacting the propene in the presence of hydrogen at a temperature of about 100° C. to about 500° C. and a pressure of about 10 atmospheres to about 100 atmospheres with a catalyst comprising a solid acidic cracking catalyst on which is deposited nickel sulfide, and recovering branched hydrocarbons having 4–6 carbon atoms per molecule.

2. A process for the conversion of propene into higher boiling branched hydrocarbons having from 4–6 carbon atoms per molecule which comprises contacting propene in the presence of hydrogen at a temperature of about 100° C. to about 500° C. and a pressure of about 10 atmospheres to about 100 atmospheres with a solid acidic cracking catalyst on which is deposited a sulfide of a metal selected from the group consisting of chromium, molybdenum, tungsten, iron, cobalt, nickel, and mixtures thereof, and recovering branched hydrocarbons having 4–6 carbon atoms per molecule.

3. A process for the conversion of propene into higher boiling branched hydrocarbons having from 4–6 carbon atoms per molecule which comprises contacting propene in the presence of hydrogen at a temperature of about 200° C. to about 400° C., a pressure of about 10 atmospheres to about 100 atmospheres, and a liquid hourly space velocity of from about 0.5 to about 20, with a solid acidic cracking catalyst on which is deposited a sulfide of a metal selected from the group consisting of chromium, molybdenum, tungsten, iron, cobalt, nickel, and mixtures thereof, and recovering branched hydrocarbons having 4–6 carbon atoms per molecule.

4. A process for the conversion of propene into higher boiling branched hydrocarbons having from 4–6 carbon atoms per molecule which comprises contacting propene in the presence of hydrogen at a temperature of about 100° C. to about 500° C. and a pressure of about 20 atmospheres to about 60 atmospheres, the hydrogen partial pressure being at least 50% of the total pressure, with a catalyst comprising a solid acidic cracking catalyst on which is deposited from about 0.5% to about 15%, based on the weight of the final catalyst, of a sulfide of a metal selected from the group consisting of chromium, molybdenum, tungsten, iron, cobalt, nickel and mixtures thereof, and recovering branched hydrocarbons having 4–6 carbon atoms per molecule.

5. A process for the conversion of propene into higher boiling branched hydrocarbons having from 4–6 carbon atoms per molecule which comprises contacting propene in the presence of hydrogen at a temperature of about 100° C. to about 500° C. and a pressure of about 10 atmospheres to about 100 atmospheres, the hydrogen partial pressure being at least 50% of the total pressure, with a catalyst comprising a silica-alumina cracking catalyst support having at least 60% by weight silica and on which is deposited from about 0.5% to about 15%, based on the weight of the final catalyst, of a sulfide of a metal selected from the group consisting of chromium, molybdenum, tungsten, iron, cobalt, nickel and mixtures thereof, and recovering branched hydrocarbons having 4–6 carbon atoms per molecule.

6. A process for the conversion of propene into higher boiling branched hydrocarbons having from 4–6 carbon atoms per molecule which comprises contacting propene in the presence of hydrogen at a temperature of about 200° C. to about 400° C., a pressure of about 10 to about 100 atmospheres, the hydrogen partial pressure being at least 50% of the total pressure, and a liquid hourly space velocity of from about 0.5 to about 20 with a catalyst comprising from about 0.5 to about 15%, based on the weight of the final catalyst, nickel sulfide supported on silica-alumina cracking catalyst having at least 60% by weight silica.

References Cited in the file of this patent
UNITED STATES PATENTS

| | | |
|---|---|---|
| 1,988,112 | Egloff | Jan. 15, 1937 |
| 2,126,001 | Fulton et al. | Aug. 9, 1938 |
| 2,131,806 | Ipatieff et al. | Oct. 4, 1938 |
| 2,171,207 | Boultbee | Aug. 29, 1939 |
| 2,283,499 | Hochmuth | May 19, 1942 |
| 2,326,585 | Vesterdal | Aug. 10, 1943 |
| 2,332,276 | Stahly | Oct. 19, 1943 |
| 2,736,689 | Stuart | Feb. 28, 1956 |
| 2,775,638 | Milliken et al. | Dec. 25, 1956 |